Nov. 18, 1958
G. L. BERGERON ET AL  2,860,952
PROCESS FOR THE RECOVERY OF DISSOLVED MERCURY SALTS FROM
BRINE EFFLUENT FROM MERCURY CATHODE ELECTROLYTIC CELLS
Filed July 3, 1957
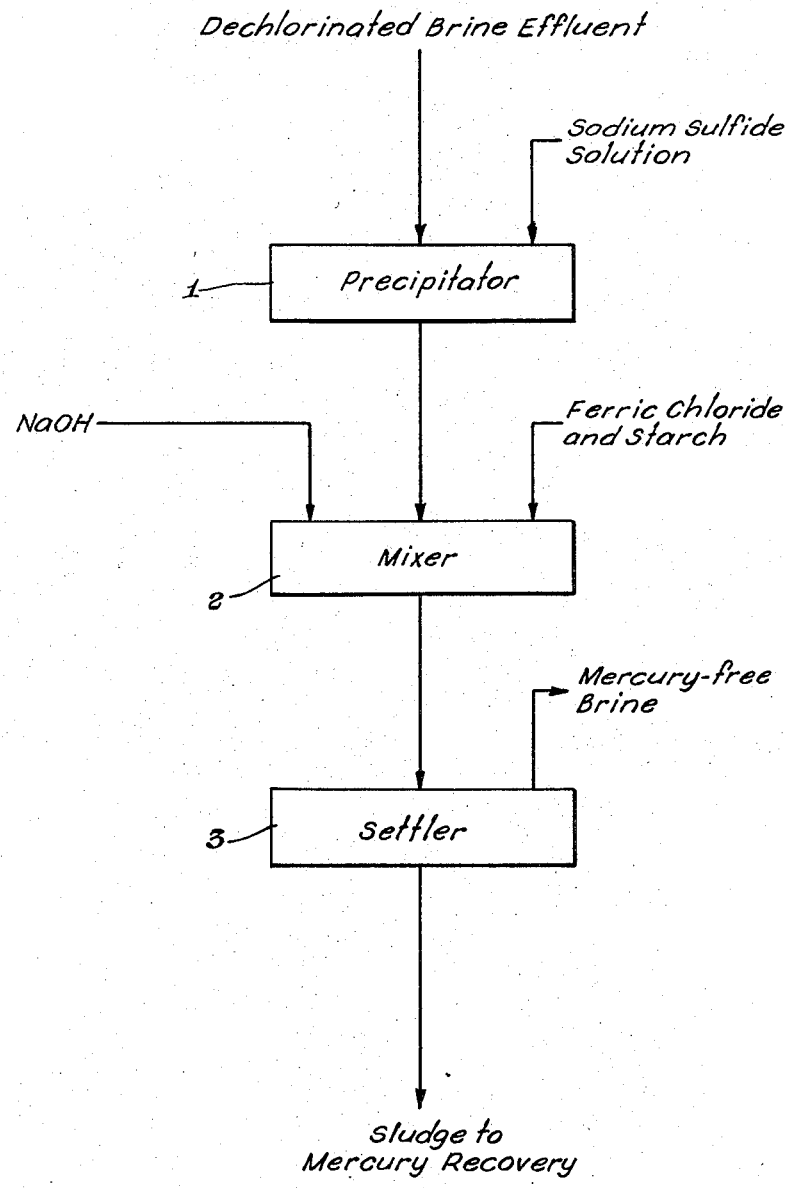
INVENTORS.
Grafton L. Bergeron
Charles K. Bon
BY *Griswold & Burdick*
ATTORNEYS

2,860,952

PROCESS FOR THE RECOVERY OF DISSOLVED MERCURY SALTS FROM BRINE EFFLUENT FROM MERCURY CATHODE ELECTROLYTIC CELLS

Grafton L. Bergeron and Charles K. Bon, Midland, Mich., assignors to The Dow Chemical Company, Midland, Mich., a corporation of Delaware Application July 3, 1957, Serial No. 669,740

4 Claims. (Cl. 23—134)

This invention relates to a process for the recovery of mercury, and more particularly, to a method of recovering mercury from brine effluent from mercury cathode electrolytic cells.

The mercury cathode electrolytic cells are constructed with a relatively small gap between a fixed anode and a steel plate or other current conducting material. In the operation of these cells, saturated sodium chloride or potassium chloride brine and mercury are passed through this gap during the electrolysis. The mercury upon entering the cell spreads over the steel plate or other conducting material and acts as a cathode for the cell. In the process saturated brine solutions are used. After passing the brine once through the cell, the brine discharged from the cell is dechlorinated by air stripping or other means, resaturated, and recycled again through the cell. When a sodium chloride brine is used, the brine generally will contain around 300 grams of sodium chloride per liter, while for potassium chloride solution, the chloride concentration may be up to around 350 grams of potassium chloride per liter. In passing through the cell the chloride concentration of the brine is seldom reduced over 20 percent. Thus, the brine discharge from the cell is still relatively saturated.

While the mercury cathode cells have many advantages over other conventional cells, a small but significant amount of mercury is lost in the process. A major portion of the mercury loss results from the chlorination of the mercury to a soluble salt which dissolves in the brine as it passes through the cell. This mercury which reacts with the chlorinated brine is often lost in the resaturation step of the process. The brine leaving the cell may contain as much as 50 parts of mercury per million parts of brine and in some cases a considerably greater amount. This loss of mercury while small per pass becomes considerable when a battery of cells is operated over an extended period of time.

It is, therefore, a principal object of this invention to provide a process for the recovery of mercury from the brine discharged from mercury cathode cells. A further object is to recover the mercury by an economical method which will not contaminate the brine and make it unsuitable for further electrolysis.

The above and additional objects may be accomplished by adding a soluble sulfide to the brine to convert the reacted mercury in the brine to a mercury sulfide dispersion and then separating the dispersion from the brine through flocculation. A ferric compound and starch or gum arabic are added to the brine and the mercury sulfide flocculated by adjusting the pH of the mixture. The combined precipitate is then recovered from the brine by mechanical means and processed by usual methods to recover the mercury.

The term "mercury sulfide," as used herein, means mercuric sulfide, mercurous sulfide, or a mixture thereof.

The term "brine," as used herein, means natural or artificial aqueous solutions of sodium chloride or potassium chloride.

While it is known that mercury sulfide may be precipitated from solution, it is unexpected that the mercury could be substantially completely recovered from relatively saturated solutions containing very small amounts of mercury. A saturated sodium chloride brine used as feed to the cells contains around 300 grams of sodium chloride per liter which after passage through the cell is still relatively concentrated containing more than 240 grams of sodium chloride per liter. When a potassium chloride brine is used, the concentration of potassium chloride per liter of the brine is even higher. Since the precipitation is carried out from relatively saturated brine and from brine containing relatively small amounts of dissolved mercury, an extremely fine colloidal type sol or dispersion of mercury sulfide is obtained. This fine dispersion cannot be separated from the brine by settling or filtration. The solid mercury sulfide particles in the dispersion are so minute that an extremely fine filter medium must be used which immediately becomes clogged. The prior art precipitation of mercury sulfide is carried out at a relatively high temperature and from a solution containing an appreciable amount of mercury and only a limited amount of other salts. Consequently, the extremely fine colloidal dispersion of mercury sulfide is not obtained. Thus, it is surprising to find that small amounts of mercury can be recovered by low temperature precipitation as mercury sulfide from relatively saturated brine solution and that the resulting extremely fine colloidal dispersion can be readily separated by flocculation.

To obtain the mercury sulfide dispersion, a soluble sulfide is added to the brine. Any soluble sulfide may be used. Especially effective are the alkali metal sulfides such as sodium sulfide, potassium sulfide, lithium sulfide, cesium sulfide, and rubidium sulfide. Hydrogen sulfide may also be used. Generally, the sulfide is added as a 1/20 to 1 normal aqueous solution. However, when hydrogen sulfide is used it may be bubbled directly into the brine. Since the brine is recycled, it is generally preferred to use sodium sulfide or hydrogen sulfide for sodium chloride brines and potassium sulfide or hydrogen sulfide for potassium chloride brines. By use of these compounds, the contamination of the brine by other metals is minimized. Although a stoichiometric amount of the sulfide to react with the soluble mercury present in the brine may be used, a stoichiometric excess in the range of 20 to 100 percent is generally employed, preferably a stoichiometric excess in the range of 50 to 80 percent. A substantially complete precipitation is obtained when a 20 percent stoichiometric excess is used. With an amount of sulfide greater than a 100 percent excess, a portion of the mercury sulfide is converted to a soluble polysulfide which remains in the brine.

The extremely fine colloidal particles obtained by the sulfide treatment are flocculated by adding a soluble ferric compound and starch to the brine. Any ferric soluble salt which will produce ferric ions, such as ferric chloride, ferric nitrate, ferric sulphate, etc. may be employed. Ferric chloride is preferred. Only small amounts of the ferric salt and the starch are necessary to flocculate the precipitate. Amounts as small as 2 parts by weight of the ferric salt and 0.5 part by weight of starch per million parts of brine may be employed. Generally, the amounts used are from 5 to 20 parts by weight of the ferric salt per million parts of brine and from 0.5 to 5 parts by weight of starch per million parts of brine. Larger amounts of these constituents are not deleterious. However, normally very little beneficial effect is obtained by increasing the ferric salt concentration above 20 parts per million and the starch above 5 parts per million parts of brine. Gum arabic may also be used in place of starch in approximately the same amounts as starch.

To effect the flocculation it is necessary to adjust the pH of the brine to a value between 5 and 11, preferably in the range of 8 to 10, to convert the ferric ions to a gelatinous ferric hydroxide. The brine effluent leaving the cell is slightly acidic and thus a basic compound must be added. Any soluble alkaline compound, such as alkali metal hydroxides, alkaline earth metal hydroxides, carbonates, etc. may be used. The alkali metal hydroxides are preferred, especially sodium hydroxide in a sodium chloride brine and potassium hydroxide in a potassium chloride brine. After the flocculation, the precipitate may be easily separated from the brine by settling, filtration, or other mechanical means.

The temperature and pressure at which the process is carried out is not critical. Generally, the brine is treated at its effluent temperature and atmospheric pressure. Temperatures above the effluent brine temperature would aid in the flocculation of the mercury sulfide, but the cost of heating the brine to a higher temperature would be prohibitive in view of the amount of mercury recoverable from the brine.

The attached figure diagrammatically shows a continuous process for recovering the mercury from a sodium chloride brine using the preferred embodiments. Dechlorinated brine discharged from the electrolytic cell is passed into agitated precipitator 1. A sodium sulfide solution is added to the precipitator in an amount such that a stoichiometric excess in the range of 50 to 80 percent is maintained to convert the dissolved mercury present in the brine to mercury sulfide. The brine containing the fine colloidal particles of mercury sulfide is passed to mixer 2 where ferric chloride and starch are added. The amount of ferric chloride added is in the range of 5 to 20 parts by weight per million parts of brine and the starch in the range of 0.5 and 5 parts by weight per million parts of brine. Also, sodium hydroxide solution is added to the mixture until the pH in mixer 2 is in the range of 8 to 10. The retention time in the mixer is in the range of 10 to 30 minutes. From the mixer the brine containing the ferric hydroxide starch, and mercury sulfide is passed to settler 3 where the ferric hydroxide and mercury sulfide settle out as a sludge and are withdrawn from the settler. The overflow from the settler is a substantially mercury-free brine which can then be further saturated and returned to the electrolytic cells. The sludge containing the mercury sulfide is then processed by known methods to recover the mercury. It is apparent that a batch process can also be used.

The following example further illustrates the invention but it is not to be construed as limiting it thereto.

*Example I*

To 1 liter of dechlorinated brine effluent from a mercury cathode electrolytic cell containing around 50 parts of mercury per million parts of brine, 1.5 milliliters of 0.1 N sodium sulfide solution were added while the brine was agitated. The brine which was transparent prior to the addition of sodium sulfide immediately became cloudy as a fine colloidal dispersion of mercury sulfide was formed. This colloidal dispersion would not settle nor could it be satisfactorily filtered. To the brine containing the dispersion, 26 milligrams of ferric chloride and around 2 milligrams of starch were added. A sodium hydroxide solution of 0.1 normality was also added to the mixture while it was agitated until the pH of the mixture was 10. After the addition of sodium hydroxide, the mixture was stirred for an additional 15 minutes, and then allowed to settle. In a period of 10 minutes, the mercury sulfide had settled to the extent that less than 1 part by weight of mercury per million parts of brine remained in the brine.

In a manner similar, the mercury in a potassium chloride brine discharged from a mercury cathode electrolytic cell may be likewise recovered. Also, in place of the sodium sulfide solution, a solution of potassium sulfide, lithium sulfide, other soluble sulfides, and hydrogen sulfide, either gaseous or dissolved in water, may be substituted. Other soluble ferric compounds, such as ferric sulphate, ferric nitrate, etc. may be substituted for the ferric chloride and gum arabic for starch.

It will be apparent from the detailed discussion in the specification and the example that by the invention the small amount of soluble mercury salts that are present in the brine effluent may be economically recovered. The amount of reactants used is extremely small thus making the process very economical. Also, a brine containing less than 1 part per million of mercury can be obtained in a settling time around 10 minutes. Thus, the process requires relatively small size equipment to process a large amount of brine effluent.

What is claimed is:

1. A process for the recovery of dissolved mercury salts from brine effluent from mercury cathode electrolytic cells, which comprises adding to the brine a soluble sulfide compound in an amount not greater than a 100 percent stoichiometric excess to convert the dissolved mercury to a mercury sulfide dispersion, intermixing with the brine containing the mercury sulfide dispersion a soluble ferric salt and a compound selected from the group consisting of starch and gum arabic at a pH in the range of 5 to 11 to flocculate the mercury sulfide, and separating the flocculated mercury sulfide from the mixture.

2. A process for the recovery of dissolved mercury salts from brine effluent from mercury cathode electrolytic cells, which comprises adding to the brine effluent a soluble sulfide compound in a stoichiometric excess amount in the range of 20 to 100 percent to convert the dissolved mercury salts to a mercury sulfide dispersion, intermixing with the brine containing the mercury sulfide dispersion from 2 to 20 parts by weight per million parts of brine of a soluble ferric compound and from 0.5 to 5 parts by weight per million parts of the brine of a compound selected from the group consisting of starch and gum arabic, adding a soluble alkali metal hydroxide to the resulting mixture until the pH of the mixture is in the range of 5 to 11 to flocculate the mercury sulfide, and separating the flocculated mercury sulfide from the mixture.

3. A process for the recovery of dissolved mercury salts from brine effluent from mercury cathode electrolytic cells using a sodium chloride brine, which comprises adding to the brine effluent sodium sulfide in a stoichiometric excess amount in the range of 50 to 80 percent to convert the dissolved mercury salts to a mercury sulfide dispersion, intermixing from 5 to 20 parts by weight of ferric chloride per million parts of brine and from 0.5 to 5 parts by weight of starch per million parts of brine, adding a solution of sodium hydroxide to the brine containing the ferric chloride, starch, and mercury sulfide until the pH of the brine is in the range of 8 to 10 to flocculate the mercury sulfide, and separating the flocculated mercury sulfide from the brine.

4. A process for the recovery of dissolved mercury salts from brine effluent from mercury cathode electrolytic cells using a potassium chloride brine, which comprises adding to the brine effluent potassium sulfide in a stoichiometric excess amount in the range of 50 to 80 percent to convert the dissolved mercury salts to a mercury sulfide dispersion, intermixing from 5 to 20 parts by weight of ferric chloride per million parts of brine and from 0.5 to 5 parts by weight of starch per million parts of brine, adding a solution of potassium hydroxide to the brine containing the ferric chloride, starch, and mercury sulfide until the pH of the brine is in the range of 8 to 10 to flocculate the mercury sulfide, and separating the flocculated mercury sulfide from the brine.

No references cited.